(12) United States Patent
Li et al.

(10) Patent No.: US 10,663,413 B2
(45) Date of Patent: May 26, 2020

(54) INSPECTION DEVICES AND METHODS FOR INSPECTING A CONTAINER

(71) Applicants: Nuctech Company Limited, Haidian District, Beijing (CN); Tsinghua University, Haidian District, Beijing (CN)

(72) Inventors: Qiang Li, Beijing (CN); Jianping Gu, Beijing (CN); Bin Xu, Beijing (CN); Yaohong Liu, Beijing (CN); Ziran Zhao, Beijing (CN)

(73) Assignees: Nuctech Company Limited, Haidian District, Beijing (CN); Tsinghua University, Haidian District, Beijing (CN)

( * ) Notice: Subject to any disclaimer, the term of this patent is extended or adjusted under 35 U.S.C. 154(b) by 205 days.

(21) Appl. No.: 15/865,520

(22) Filed: Jan. 9, 2018

(65) Prior Publication Data

US 2018/0195979 A1 Jul. 12, 2018

(30) Foreign Application Priority Data

Jan. 12, 2017 (CN) .......................... 2017 1 0021567

(51) Int. Cl.
*G01N 23/046* (2018.01)
*G01V 5/00* (2006.01)
*G01N 23/041* (2018.01)

(52) U.S. Cl.
CPC ......... *G01N 23/046* (2013.01); *G01N 23/041* (2018.02); *G01V 5/0016* (2013.01); *G01N 2223/419* (2013.01)

(58) Field of Classification Search
None
See application file for complete search history.

(56) References Cited

U.S. PATENT DOCUMENTS 5,600,700 A 2/1997 Krug et al.
6,317,509 B1 * 11/2001 Simanovsky .......... G01V 5/005
250/363.04

(Continued)

FOREIGN PATENT DOCUMENTS

| CN | 102175701 A | 9/2011 |
| CN | 103729842 A | 4/2014 |
| CN | 105784732 A | 7/2016 |

OTHER PUBLICATIONS

First Chinese Office Action for corresponding Chinese Patent Application No. 201710021567.0 dated Jan. 6, 2020, 18 pages (English translation).

*Primary Examiner* — Fayyaz Alam
(74) *Attorney, Agent, or Firm* — Merchant & Gould P.C.

(57) ABSTRACT

A method for inspecting a container and an inspection device are disclosed. X-ray scanning is performed on the inspected container to obtain a scanned image. The scanned image is processed to obtain a region of interest. Features of texture units included in the region of interest are calculated. Local descriptions of the texture units are formed based on the features of the texture units. Distinction of each local point is calculated from a local description of each of the texture units so as to obtain a local distinct map of the region of interest. It is determined whether there is an article which is secretly carried in the inspected container using the local distinct map.

11 Claims, 3 Drawing Sheets

(56) References Cited

U.S. PATENT DOCUMENTS

| | | | |
|---|---|---|---|
| 2005/0036689 A1* | 2/2005 | Mahdavieh | G01V 5/0008 |
| | | | 382/199 |
| 2015/0010237 A1* | 1/2015 | Nomura | G06K 9/3241 |
| | | | 382/195 |
| 2015/0186374 A1* | 7/2015 | Li | G01V 5/0058 |
| | | | 707/740 |
| 2015/0332448 A1* | 11/2015 | Zhang | G01V 5/005 |
| | | | 382/103 |
| 2016/0335503 A1* | 11/2016 | Zhang | G06K 9/00 |

* cited by examiner

INSPECTION DEVICES AND METHODS FOR INSPECTING A CONTAINER

This application claims benefit of Serial No. 201710021567.0, filed 12 Jan. 2017 in China and which application is incorporated herein by reference. A claim of priority is made to each of the above disclosed applications.

TECHNICAL FIELD

The present disclosure relates to automatic detection of an article which is secretly carried in a radiation image, and more particularly, to a method and device for inspecting an article which is secretly carried in a system for scanning a large container.

BACKGROUND

Inspection of an article which is secretly carried is one of basic purposes of inspection of a container using a machine. Cargos or dangerous articles which are not reported are secretly carried in the container to achieve the purpose of illegally obtaining profits, which is not only reflected in tax losses of the government due to the smuggling of the cargoes, but also may provide prohibited articles to criminal organizations and terrorist organizations thereby affecting social stability. Therefore, the problems of the articles which are secretly carried are of self-evident importance.

Automatic detection has become the current development trend of the security inspection technology. Radiation imaging achieves the purpose of non-invasive inspection by performing transmission imaging on cargos, a luggage etc., has currently been widely used in places such as airports, customs, railway stations and large gatherings etc., and is the most important means in the security inspection field of prohibited articles. In the process of inspection of the container, although an image of cargoes in the container has been obtained, the effect of manual judgment is unsatisfied since there is a wide variety of cargoes, image judgers have various experience levels and it is a low probability that smuggled articles exist. In a case that the current security situation is increasingly urgent and the problems of the security inspection of the container are prominent, a large number of images which are inspected using a machine require a lot of manpower investment for judgment of the images, and therefore automatic detection has become a hot issue attracting attention in the world.

However, in a case that the automatic detection means is not perfect, there is a lack of related effective means for the detection problems of such a non-specific category as "articles which are secretly carried", and there is currently no targeted public literature.

SUMMARY

In view of one or more of the problems in the related art, an inspection device and a method for inspecting a container are proposed.

In an aspect of the present disclosure, there is proposed a method for inspecting a container, comprising steps of: performing X-ray scanning on the inspected container to obtain a scanned image; processing the scanned image to obtain a region of interest; calculating features of texture units included in the region of interest; forming local descriptions of the texture units based on the features of the texture units; calculating distinction of each local point from a local description of each of the texture units so as to obtain a local distinct map of the region of interest; and determining whether there is an article which is secretly carried in the inspected container using the local distinct map.

According to some embodiments, the step of determining whether there is an article which is secretly carried in the inspected container using the local distinct map comprises: determining a candidate region for the article which is secretly carried; and determining that there is an article which is secretly carried in the candidate region based on a distinction value of the candidate region and a number of adjacent candidate points.

According to some embodiments, the step of determining that there is an article which is secretly carried in the candidate region based on a distinction value of the candidate region and a number of adjacent candidate points comprises: determining that there is an article which is secretly carried in the candidate region by comparing the distinction value of the candidate region with a first threshold and comparing the number of the adjacent candidate points with a second threshold.

According to some embodiments, the features of the texture units are represented as a multi-dimensional vector, and the method further comprises a step of: reducing a dimension of the multi-dimensional vector to 1 by means of a dictionary description.

According to some embodiments, the step of calculating distinction of each local point from a local description of each of the texture units comprises: reducing complexity of the local description using an integrate image method; and calculating the distinction of the local description using a sliding window with a fixed step size.

According to some embodiments, the method further comprises: calculating similarities between any local description and local descriptions which is adjacent to the local description and is not overlapped with the local description, and determining a maximum value of the similarities as distinction of a center of the local description.

According to some embodiments, the method further comprises:

calculating Euclidean distances between any local description and local descriptions which is adjacent to the local description and is not overlapped with the local description, and determining a minimum value of the Euclidean distances as distinction of a center of the local description.

According to some embodiments, the step of determining whether there is an article which is secretly carried in the inspected container using the local distinct map comprises: calculating local distinct maps on different scales, overlapping the local distinct maps on different scales, and then determining whether there is an article which is secretly carried in the inspected container using the overlapped local distinct maps.

In another aspect of the present disclosure, there is proposed an inspection device, comprising: a scanning device comprising a ray source and a detector, and configured to perform $\lambda$ transmission scanning on the inspected container to obtain a scanned image; a data processing device configured to: process the scanned image to obtain a region of interest; calculate features of texture units included in the region of interest; form local descriptions of the texture units based on the features of the texture units; calculate distinction of each local point from a local description of each of the texture units so as to obtain a local distinct map of the region of interest; and determine whether there is an article which is secretly carried in the inspected container using the local distinct map.

According to some embodiments, the data processing device is configured to: determine a candidate region for the article which is secretly carried; and determine that there is an article which is secretly carried in the candidate region based on a distinction value of the candidate region and a number of adjacent candidate points.

According to some embodiments, the data processing device is configured to determine that there is an article which is secretly carried in the candidate region by comparing the distinction value of the candidate region with a first threshold and comparing the number of the adjacent candidate points with a second threshold.

According to some embodiments, the data processing device is configured to: reduce complexity of the local description using an integrate image method; and calculate the distinction of the local description using a sliding window with a fixed step size.

According to some embodiments, the data processing device is configured to calculate similarities between any local description and local descriptions which is adjacent to the local description and is not overlapped with the local description, and determine a maximum value of the similarities as distinction of a center of the local description.

According to some embodiments, the data processing device is configured to calculate Euclidean distances between any local description and local descriptions which is adjacent to the local description and is not overlapped with the local description, and determine a minimum value of the Euclidean distances as distinction of a center of the local description.

According to some embodiments, the data processing device is configured to calculate local distinct maps on different scales, overlapping the local distinct maps on different scales, and then determine whether there is an article which is secretly carried in the inspected container using the overlapped local distinct maps.

With the above solutions, the articles which are secretly carried in the container can be effectively inspected, thereby improving the inspection efficiency of the container.

BRIEF DESCRIPTION OF THE DRAWINGS

For a better understanding of the present disclosure, the present disclosure will be described in detail according to the following accompanying drawings.

DETAILED DESCRIPTION

The specific embodiments of the present disclosure will be described in detail below. It should be noted that the embodiments herein are used for illustration only, without limiting the present disclosure. In the description below, a number of specific details are explained to provide better understanding of the present disclosure. However, it is apparent to those skilled in the art that the present disclosure can be implemented without these specific details. In other instances, well known structures, materials or methods are not described specifically so as not to obscure the present disclosure.

Throughout the specification, the reference to "one embodiment," "an embodiment," "one example" or "an example" means that the specific features, structures or properties described in conjunction with the embodiment or example are included in at least one embodiment of the present disclosure. Therefore, the phrases "in one embodiment," "in an embodiment," "in one example" or "in an example" occurred in various positions throughout the specification may not necessarily refer to the same embodiment or example. Furthermore, specific features, structures or properties may be combined into one or more embodiments or examples in any appropriate combination and/or sub-combination. Moreover, it should be understood by those skilled in the art that the term "and/or" used herein means any and all combinations of one or more listed items.

In view of the problems in related art when smuggling of cargoes is inspected, the embodiments of the present disclosure propose a method for performing security inspection on a container and an inspection device.

According to the embodiment of the present disclosure, it is proposed to automatically detect an article which is secretly carried based on a DR (Digital Radiography) image of the container. Specifically, in the process of inspecting smuggling in the container, a ray scanning imaging technology is used to automatically detect a cargo region in an image where texture features are significantly different from those of other regions. If there is such a cargo region, a position of a suspicious article in the image is given, so as to assist manual judgment of whether there is a smuggling case. The use of such automatic inspection technology for the article which is secretly carried can, on the one hand, improve the accuracy of the inspection of the article which is secretly carried, and on the other hand, can also increase the efficiency of the inspection to assist the manual inspection.

Figure 1:
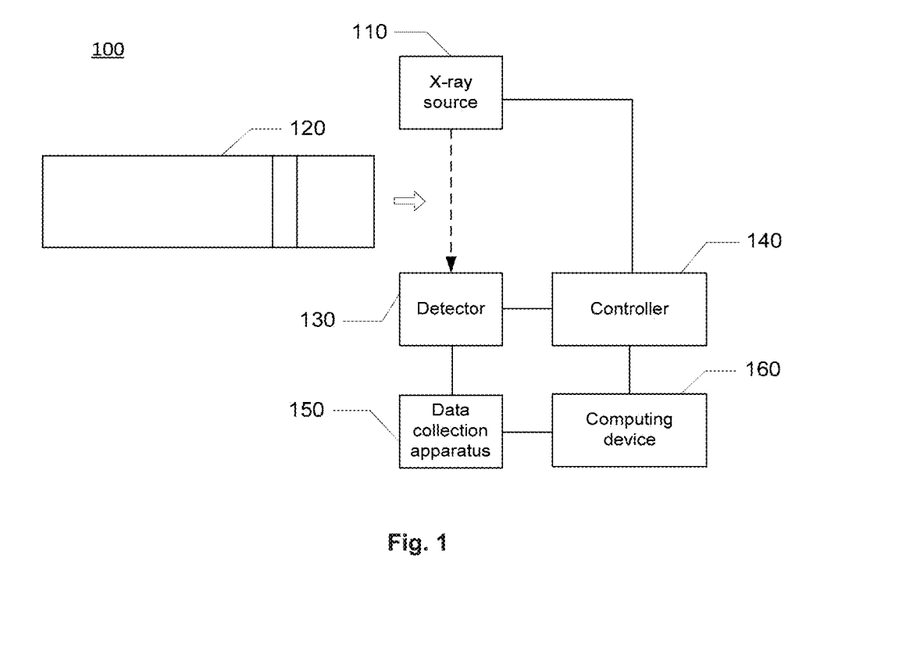
FIG. 1 illustrates a structural diagram of an inspection device according to an embodiment of the present disclosure.

FIG. 1 illustrates a structural diagram of an inspection device according to an embodiment of the present disclosure. As shown in FIG. 1, an inspection device 100 according to an embodiment of the present disclosure comprises an X-ray source 110, a detector 130, a data collection apparatus 150, a controller 140, and a computing device 160, and performs security inspection on an inspected object 120 such as a container truck etc., for example, judges whether there is an article which is secretly carried, i.e., an article which does not comply with a customs declaration, for example, a smuggled article, included therein. Although the detector 130 and the data collection apparatus 150 are separately described in this embodiment, it should be understood by those skilled in the art that they may also be integrated together as an X-ray detection and data collection device.

According to the embodiment of the present disclosure, the detector 130 may be a linear type detector or an L-type detector or an area array detector. It should be understood by those skilled in the art that the area array detector etc. may also be used in other embodiments, which can increase the speed of X-ray scanning. Depending on different ray sources which are used, a single-energy detector or a dual-energy detector or other detectors may be used.

According to some embodiments, the X-ray source 110 may be an isotope, or may also be an X-ray machine, an accelerator, etc. The X-ray source 110 may be a single-energy ray source or a dual-energy ray source. In this way, transmission scanning is performed on the inspected object 120 through the X-ray source 110, the detector 150, the controller 140, and the computing device 160 to obtain detection data. For example, in a process that the inspected object 120 moves, an operator controls the controller 140 to transmit an instruction through a man-machine interface of the computing device 160 to instruct the X-ray source 110 to emit rays, which are transmitted through the inspected object 120 and are then received by the detector 130 and the data collection device 150. Further, data is processed by the computing device 160 to obtain a transmission image. The computing device 160 then processes the transmission image to detect a cargo region in the transmission image where texture features are significantly different from those of other regions. If there is such a cargo region, a position of a suspicious article in the transmission image is given, so as to assist manual judgment of whether there is a smuggling case. In addition, in a case of a dual-energy inspection system, a result of the judgment described above and an atomic number value of a suspicious article obtained by the dual-energy inspection may be comprehensively judged to determine whether it is an article which is secretly carried. For example, a suspicious article which has the same result of the automatic inspection and the same result of the atomic number inspection as those of an article which is secretly carried is determined to be inspected by opening the container, which improves the accuracy of the inspection.

Figure 2:
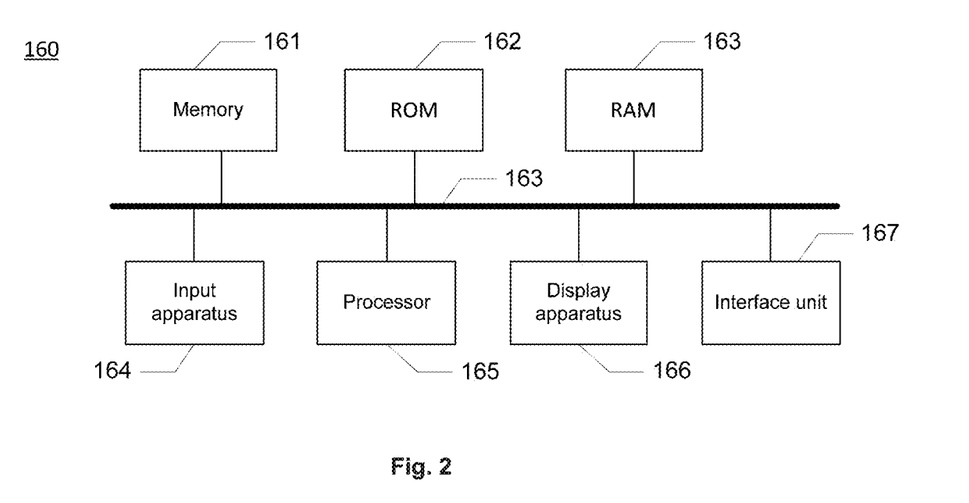
FIG. 2 is a diagram illustrating a structure of a computing device included in the inspection device illustrated in FIG. 1.

FIG. 2 illustrates a structural diagram of the computing device illustrated in FIG. 1. As shown in FIG. 2, a signal detected by the detector 130 is collected by a data collector, and data is stored in a memory 161 through an interface unit 167 and a bus 163. A Read Only Memory (ROM) 162 stores configuration information and programs of a computer data processor. A Random Access Memory (RAM) 163 is configured to temporarily store various data when a processor 165 is in operation. In addition, computer programs for performing data processing, such as an automatic inspection program, a material recognition program, and an image processing program etc., are also stored in the memory 161. The internal bus 163 connects the memory 161, the ROM 162, the RAM 163, an input apparatus 164, the processor 165, a display apparatus 166, and the interface unit 167 described above.

After a user inputs an operation command through the input apparatus 164 such as a keyboard and a mouse etc., instruction codes of a computer program instruct the processor 165 to perform a predetermined data processing algorithm. After a result of the data processing is acquired, the result is displayed on the display apparatus 166 such as a Liquid Crystal Display (LCD) display etc. or is directly output in a form of hard copy such as printing etc.

Figure 3:
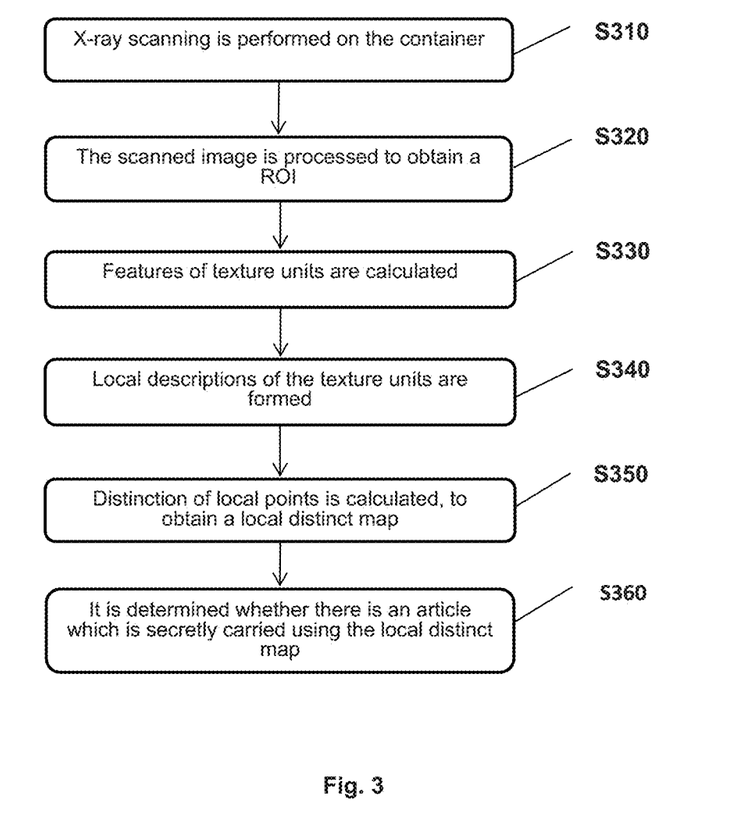
FIG. 3 is a schematic flowchart illustrating a method for performing security inspection on a container according to an embodiment of the present disclosure.

FIG. 3 is a schematic flowchart illustrating a method for performing security inspection on a container according to an embodiment of the present disclosure. As shown in FIG. 3, the inspection method according to the embodiment of the present disclosure may be implemented as software or firmware or may be implemented in other suitable manners. After the inspected container is scanned to obtain a transmission image, a computing device 160, such as a computer etc., executes programs to implement the inspection method according to the present disclosure. In the embodiment of the present disclosure, the computing device 160 inspects differences among local textures of an image without other auxiliary information such as an image of the same type of cargoes etc., to determine whether there is an article which is secretly carried in the container, and outputs a result to a user by, for example, transmitting an alarm, or marking a region of the article which is secretly carried using a block.

As shown in FIG. 3, in step S310, X-ray transmission scanning is performed on the inspected container using the inspection device which includes the radiation source 110, the detector 130, the data processing device 150, the controller 140, and the calculation device 160.

For example, in other embodiments, the computing device 160 may further perform an image normalization operation on the scanned image, to cut a compartment portion as a Region of Interest (ROI). Specifically, different scanning devices may obtain images with different physical characteristics due to different energy/doses of ray sources and different sizes of detectors. In order to reduce this difference, the image is firstly required to be normalized by firstly correcting the image with an air portion as a reference value and then scaling the image according to a physical size of the detector.

As another example, the normalization may be implemented by image processing operations such as removal of attenuation due to the background and the air, removal of row/column stripes etc. Then, a region of cargoes may be obtained by operations such as binarization, edge extraction, container edge detection etc. In this way, the region of the cargoes can be extracted while minimizing the impact of inconsistent physical characteristics of the device on the image as much as possible.

Then, in step S320, the computing device 160 obtains a ROI of the scanned image. For example, the computing device 160 acquires the scanned image and obtains a region of the compartment as the ROI.

For example, in some embodiments, features of the ROI are acquired intensively by means of a sliding window. Each window is defined as a Texture Element (TE). In order to make the description more accurate, a size and a sliding step size of the TE should be as small as possible. Here, features of the TE may be extracted using a variety of methods, such as a variety of local descriptors such as SIFT, HOG, LBP, etc., which can achieve a result to some extent. In some embodiments, the features of the TE obtained in this step are a high-dimensional vector. In other embodiments, the features of the TE obtained in this step is a one-dimensional vector.

Specifically, every 8*8 rectangular local regions may be arranged in a row, which results in a 64-dimensional "feature" of each sliding window. For a local region, an accurate description of the region is obtained. In addition, as a preferred special case, Local Binary Patterns (LBP) [5] may be used to describe 3*3 regions. In this case, one-dimensional features are output by the LBP in the local region.

In step S330, the computing device 160 computes features of texture units. For example, the computing device 160 defines a region which is adjacent to each pixel as a TE and then calculates TE Features (TEFs).

In some embodiments, if each TEF has a dimension of more than 1, the dimension of the feature is reduced to 1 by means of a dictionary. For example, the TE feature is a detailed description. In order to obtain a feature which is not detailed but is relatively stable, the dimension of the TE feature may be reduced. Preferably, in the embodiments of the present disclosure, the dimension of the TE feature is reduced to 1 by means of a dictionary description. That is, all TEFs are obtained firstly, then several cluster centers are obtained by clustering, and each of the TEFs is represented by an index of a cluster center.

Specifically, if a size of the dictionary is set to 200 for example, various TE features are clustered using an algorithm such as KMeans etc. to obtain a central vector of each category, and a label value is assigned to each vector to form a "dictionary." Then, an entry of the dictionary which is closest to each TEF is found, and a label value of the entry is assigned to the TEF, so that the dimension of the TE feature is reduced to 1. As a visual understanding, each pixel is converted into a "character" of the dictionary description, wherein the character has an integer value in a range from 1 to a number of entries of the dictionary.

In addition, it can be reached by those skilled in the art that a better effect can be achieved using a sparse dictionary method. However, for the consideration of real-time performance, a clustering method is selected to be used here.

In step S340, the computing device 160 forms local descriptions of the texture units. For example, for a plurality of adjacent TEs, the computing device 160 performs statistics on the Local Descriptions (LD) thereof.

For example, a process of dimension reduction of the TEs mainly comprises noise reduction and regularization. At this time, the feature data is still over-detailed in a spatial domain. A plurality of adjacent TEs may be used to form local descriptions, which results in a more stable feature representation in a local region. As the dimension of the TE features has been reduced to 1, the LD may be represented using a histogram in some embodiments.

In addition, in order to reduce the computational complexity, firstly, statistics may be performed on the LD using a method similar to the integrate image. Secondly, distinction of each region may be obtained using a sliding window with a fixed step size.

Figure 4:
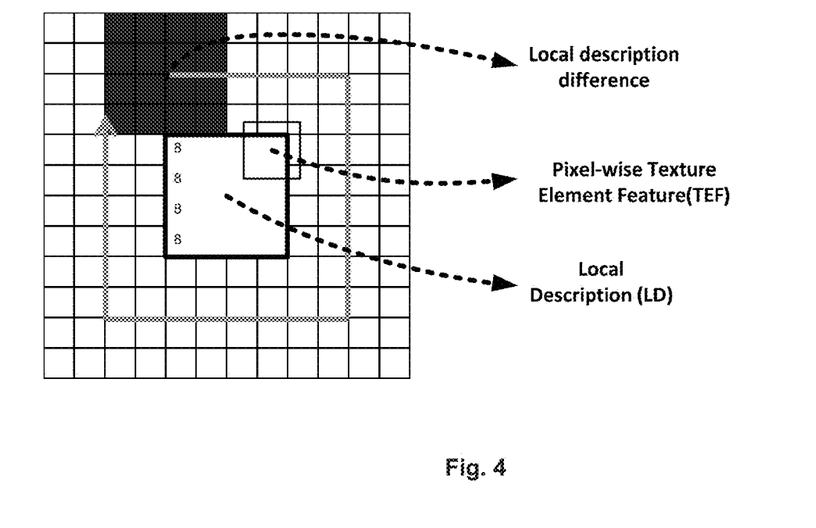
FIG. 4 is a diagram illustrating a relationship between texture units and local descriptions according to an embodiment of the present disclosure.

FIG. 4 is a diagram illustrating a relationship between TEs and LDs according to an embodiment of the present disclosure. According to an embodiment of the present disclosure, a region with a size of 32*32 and a step size of 8 is selected to perform statistics on the LD. At this time, the LD may be visually regarded as a "word" formed by 32*32 characters.

It is easily reached by those skilled in the art that this step may be implemented by several improvements to the Bag of Words (BOW) technology, such as fisher vector or Local-constrained Linear Coding (LCC) etc.

In order to reduce the computational complexity, the statistical complexity of the LD may be reduced by using a method similar to the integrate image method. Secondly, distinction of each region may be obtained by using a sliding window with a fixed step size.

In step S350, the computing device 160 calculates distinction of local points, to obtain a distinct map. For example, for each LD, the computing device 160 obtains differences between the LD and all adjacent LDs thereof, and uses a minimum difference as a distinction value of a center of the LD to obtain a Local Distinct Map (LDM).

Here, similarities between the LD and LDs which are adjacent to the LD but are not overlapped with the LD are calculated, and a maximum value of the similarities is defined as distinction of the center of the LD. The greater the distinction, the more different the cargoes are from the surroundings here. In addition, the similarity may be calculated in a variety of manners, for example, learning-based Distance Metric Learning or direct distance calculation such as Euclidean distance. Finally, the distinction of each local point in the entire image may be visualized as an LDM.

As another example, it is preferable that, for any LD, LDs in a 3*3 region which are adjacent to the LD but are not overlapped with the LD are selected for calculation of distinction. In a case that statistics is performed on the LDs at a step size of 8, there are totally 4*8 adjacent LDs. Euclidean distances between a central LD and the 4*8 LDs are calculated respectively, and a minimum value of the Euclidean distances is the distinction. Finally, the distinction of each local point in the entire image may be visualized as an LDM.

In step S360, the computing device 160 post-processes the LDM to obtain a position of an article which is secretly carried. In addition, a multi-scale detection method may be used to solve the impact of a size of the article which is secretly carried on detection.

For example, values in the air of the LDM map and at strong edges of the image are removed to avoid a clear false positive. Preferably, edge detection and air thresholding are performed on the scanned image in step S310. After a series of morphological operations are performed, the obtained edge and air regions are used as a mask of the LDM, and calculation is not performed in the mask region. Secondly, statistics is performed on values of the remaining portion, and positions of points with more than 3 times the variance are considered as candidate regions of articles which are secretly carried. As there may possibly have an article which is secretly carried in a region among the candidate regions which has a larger value and more adjacent candidate points, a confidence value is assigned to the candidate region based on the two values. A region of which a confidence level is greater than a preset threshold is determined as a region in which there is an article which is secretly carried, to obtain a detection result.

Figure 5:
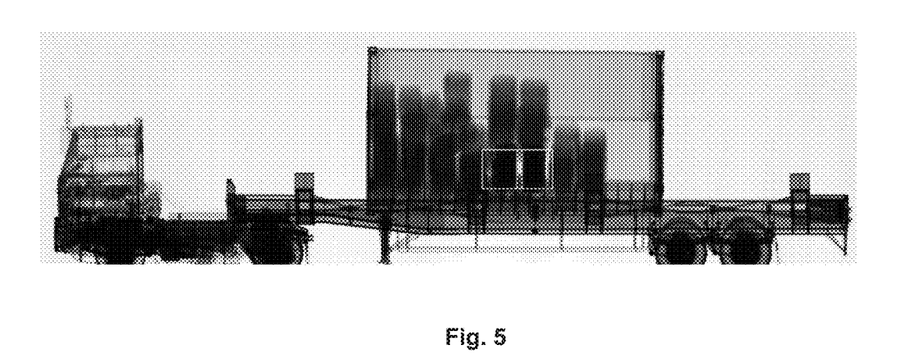
FIG. 5 is a diagram illustrating a result of security inspection according to an embodiment of the present disclosure.

FIG. 5 is a diagram illustrating a result of security inspection according to an embodiment of the present disclosure. As shown in FIG. 5, in a case that the computing device 160 determines that there is an article which is secretly carried in the container, the computing device 160 outputs a result to a user by, for example, transmitting an alarm or marking a suspicious region in which there may be an article which is secretly carried using a block.

In addition, according to some embodiments, local distinct maps on different scales are calculated, the local distinct maps on different scales are overlapped, and then an overlapped local distinct map is used to determine whether there is an article which is secretly carried in an inspected article. For example, an image may be scaled many times using a multi-scale method, inspection is performed on different scales, results are overlapped, and the above steps of determining whether there is an article which is secretly carried in the container is then performed, so as to achieve detection of the article which is secretly carried on the same scale.

The method according to the above embodiments can detect an article which is secretly carried in a scanned image of cargoes, especially the container, thereby avoiding the problems of detection vulnerability and inefficiency of manual image judgment using the traditional methods and is of great significance for cracking down on smuggling, secretly carrying of articles etc.

The foregoing detailed description has set forth various embodiments of the inspection device and the inspection method via the use of diagrams, flowcharts, and/or examples. In a case that such diagrams, flowcharts, and/or examples contain one or more functions and/or operations, it will be understood by those skilled in the art that each function and/or operation within such diagrams, flowcharts or examples may be implemented, individually and/or collectively, by a wide range of structures, hardware, software, firmware, or virtually any combination thereof. In one embodiment, several portions of the subject matter described in the embodiments of the present disclosure may be implemented via Application Specific Integrated Circuits (ASICs), Field Programmable Gate Arrays (FPGAs), Digital Signal Processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of those skilled in the art in ray of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

While the present disclosure has been described with reference to several typical embodiments, it is apparent to those skilled in the art that the terms are used for illustration and explanation purpose and not for limitation. The present disclosure may be practiced in various forms without departing from the spirit or essence of the present disclosure. It should be understood that the embodiments are not limited to any of the foregoing details, and shall be interpreted broadly within the spirit and scope as defined by the following claims. Therefore, all of modifications and alternatives falling within the scope of the claims or equivalents thereof are to be encompassed by the claims as attached.

We claim:

1. An inspection device, comprising:
a scanning device comprising a ray source and a detector, and configured to perform X transmission scanning on an inspected container to obtain a scanned image;
a data processing device configured to:
process the scanned image to obtain a region of interest;
calculate features of texture units included in the region of interest;
form local descriptions of the texture units using the features of the texture units;
calculate distinction of each local point from a local description of each of the texture units so as to obtain a local distinct map of the region of interest;
determine at least one candidate regions for the article which is secretly carried by using the local distinct map;
wherein the data processing device is further configured to
determine distinction values of the candidate regions and a number of adjacent candidate points of the candidate regions, respectively; and
determine that there is an article secretly carried in the candidate region for which the distinction value is greater than a first threshold and the number of the adjacent candidate points is greater than a second threshold.

2. The inspection device according to claim 1, wherein the data processing device is configured to:
reduce complexity of the local description using an integrate image method; and
calculate the distinction of the local description using a sliding window with a fixed step size.

3. The inspection device according to claim 1, wherein the data processing device is configured to calculate similarities between any local description and local descriptions which is adjacent to the local description and is not overlapped with the local description, and determine a maximum value of the similarities as distinction of a center of the local description.

4. The inspection device according to claim 1, wherein the data processing device is configured to calculate Euclidean distances between any local description and local descriptions which is adjacent to the local description and is not overlapped with the local description, and determine a minimum value of the Euclidean distances as distinction of a center of the local description.

5. The inspection device according to claim 1, wherein the data processing device is configured to calculate local distinct maps on different scales, overlapping the local distinct maps on different scales, and then determine whether there is an article which is secretly carried in the inspected container using the overlapped local distinct maps.

6. A method for inspecting a container, comprising steps of:
performing X-ray scanning on the inspected container to obtain a scanned image;
processing the scanned image to obtain a region of interest;
calculating features of texture units included in the region of interest;
forming local descriptions of the texture units based on the features of the texture units;
calculating distinction of each local point from a local description of each of the texture units so as to obtain a local distinct map of the region of interest; and
determining at least one candidate regions for the article which is secretly carried by using the local distinct map; and
determining distinction values of the candidate regions and a number of adjacent candidate points of the candidate regions, respectively; and
wherein that the method further comprising
determining that there is an article secretly carried in the candidate region for which the distinction value is greater than a first threshold and the number of the adjacent candidate points is greater than a second threshold.

7. The method according to claim 6, wherein the features of the texture units are represented as a multi-dimensional vector, and the method further comprises a step of:
reducing a dimension of the multi-dimensional vector to 1 by means of a dictionary description.

8. The method according to claim 6, wherein the step of calculating (S330) distinction of each local point from a local description of each of the texture units comprises:
reducing complexity of the local description using an integrate image method; and
calculating the distinction of the local description using a sliding window with a fixed step size.

9. The method according to claim 6, further comprising:
calculating similarities between any local description and local descriptions which is adjacent to the local description and is not overlapped with the local description, and determining a maximum value of the similarities as distinction of a center of the local description.

10. The method according to claim 6, further comprising:
calculating Euclidean distances between any local description and local descriptions which is adjacent to the local description and is not overlapped with the local description, and determining a minimum value of the Euclidean distances as distinction of a center of the local description.

11. The method according to claim 6, wherein the step of determining whether there is an article which is secretly carried in the inspected container using the local distinct map comprises:
calculating local distinct maps on different scales, overlapping the local distinct maps on different scales, and then determining whether there is an article which is secretly carried in the inspected container using the overlapped local distinct maps.

\* \* \* \* \*